(12) United States Patent
Trout

(10) Patent No.: US 9,398,764 B2
(45) Date of Patent: Jul. 26, 2016

(54) ELECTRONIC ICE FISHING TIP-UP WITH ILLUMINATED STRIKE INDICATORS

(71) Applicant: Jason Trout, Pine River, MN (US)

(72) Inventor: Jason Trout, Pine River, MN (US)

( * ) Notice: Subject to any disclaimer, the term of this patent is extended or adjusted under 35 U.S.C. 154(b) by 143 days.

(21) Appl. No.: 14/104,952

(22) Filed: Dec. 12, 2013

(65) Prior Publication Data

US 2014/0157651 A1    Jun. 12, 2014

(51) Int. Cl.
*A01K 97/12*    (2006.01)
*A01K 97/01*    (2006.01)
*A01K 97/00*    (2006.01)

(52) U.S. Cl.
CPC .............. *A01K 97/125* (2013.01); *A01K 97/00* (2013.01); *A01K 97/01* (2013.01); *A01K 97/12* (2013.01)

(58) Field of Classification Search
CPC ...... A01K 97/12; A01K 97/125; A01K 97/01
USPC ............................................................. 43/17
See application file for complete search history.

(56) References Cited

U.S. PATENT DOCUMENTS

| | | | | | |
|---|---|---|---|---|---|
| 75,075 | A | * | 3/1868 | Talbot ................... | A01K 97/125 43/17 |
| 253,456 | A | * | 2/1882 | Whitcomb .......... | A01K 97/125 43/17 |
| 2,198,286 | A | * | 4/1940 | Krivutza ................ | A01K 97/01 43/17 |
| 2,608,783 | A | * | 9/1952 | Rogers ................... | A01K 97/12 43/17 |
| 2,636,303 | A | * | 4/1953 | Feigley .................. | A01K 97/12 43/17 |
| 2,654,176 | A | * | 10/1953 | Kachelski .............. | A01K 97/01 43/17 |
| 3,168,789 | A | | 2/1965 | Gednalske | |
| 3,352,048 | A | * | 11/1967 | Fleming ................. | A01K 97/01 43/17 |
| 3,359,673 | A | * | 12/1967 | Roemer ................. | A01K 97/01 43/17 |
| 4,246,716 | A | * | 1/1981 | Elmer .................... | A01K 97/01 43/17 |
| 4,270,297 | A | * | 6/1981 | Yates ..................... | A01K 97/01 43/17 |
| 4,616,437 | A | * | 10/1986 | Harvey ................. | A01K 97/125 43/17 |
| 4,727,673 | A | * | 3/1988 | Dumar ................... | A01K 97/01 43/17 |
| 4,887,777 | A | * | 12/1989 | Rasmussen ........... | A01K 97/01 43/17 |
| 4,928,419 | A | | 5/1990 | Forrestal | |
| 4,934,090 | A | * | 6/1990 | Storey .................. | A01K 97/125 43/17 |
| 4,942,687 | A | * | 7/1990 | Post ....................... | A01K 97/01 43/17 |
| 4,996,788 | A | * | 3/1991 | Wieting ................. | A01K 97/01 43/17 |
| 5,097,618 | A | * | 3/1992 | Stoffel ................. | A01K 97/125 43/17 |
| 5,235,773 | A | * | 8/1993 | Rinehart ................ | A01K 97/01 43/17 |
| 5,321,391 | A | * | 6/1994 | Fox ....................... | A01K 97/125 43/17 |
| 5,758,449 | A | * | 6/1998 | Munsterman ........ | A01K 97/125 43/17 |

(Continued)

*Primary Examiner* — Darren W Ark
(74) *Attorney, Agent, or Firm* — Faegre Baker Daniels LLP

(57) ABSTRACT

A tip-up apparatus includes a base, a descending shaft hingedly coupled to the base, and a spool assembly including a top spool end and being attached to the descending shaft. The apparatus also includes a light tower and an electronic sensor coupled to the descending shaft, the electronic sensor being configured to detect movement of the spool assembly. The light tower houses at least one indicator light and is hingedly coupled to the base. The indicator light is configured to illuminate when the electronic sensor detects movement of the spool assembly.

20 Claims, 16 Drawing Sheets

(56) References Cited

U.S. PATENT DOCUMENTS

| | | | |
|---|---|---|---|
| 5,896,694 A * | 4/1999 | Midha | A01K 97/01 43/17 |
| 5,898,372 A * | 4/1999 | Johnson | A01K 93/02 43/17 |
| 5,979,101 A * | 11/1999 | Muenchow | A01K 97/01 43/17 |
| 6,170,189 B1 * | 1/2001 | Klein | A01K 97/10 43/17 |
| 6,588,137 B1 | 7/2003 | Rozkowski | |
| 6,685,125 B1 * | 2/2004 | Tucci | A01K 97/01 43/17 |
| 6,688,033 B2 * | 2/2004 | Shaff | A01K 97/01 43/17 |
| 7,008,086 B1 | 3/2006 | Kell | |
| 7,032,343 B1 * | 4/2006 | Foss | A01K 97/01 43/17 |
| 7,043,867 B1 * | 5/2006 | Fox | A01K 97/125 43/17 |
| 7,207,133 B2 * | 4/2007 | Schiemann | A01K 97/01 43/17 |
| 7,343,708 B2 | 3/2008 | Pieczynski | |
| 7,395,628 B2 * | 7/2008 | Rayfield | A01K 97/125 43/17 |
| 7,992,341 B1 * | 8/2011 | Renstrom | A01K 97/01 43/17 |
| 8,739,458 B1 * | 6/2014 | Michael | A01K 89/08 43/17 |
| 8,756,854 B1 | 6/2014 | Michaels | |
| 8,978,288 B2 * | 3/2015 | Olson | A01K 97/01 43/17 |
| 2009/0272022 A1 * | 11/2009 | Grega | A01K 97/01 43/17 |
| 2012/0131841 A1 * | 5/2012 | Galbraith | A01K 97/01 43/17 |
| 2014/0068995 A1 * | 3/2014 | Galbraith | A01K 97/01 43/17 |
| 2015/0208635 A1 * | 7/2015 | Hondl | A01K 97/01 43/17 |

\* cited by examiner

ELECTRONIC ICE FISHING TIP-UP WITH ILLUMINATED STRIKE INDICATORS

CROSS-REFERENCE TO RELATED APPLICATIONS

The present application claims priority under 35 U.S.C. §119 to U.S. Provisional Patent Application No. 61/736,275 titled "Electronic Ice Fishing Tipup with Illuminated Strike Indicators," filed on Dec. 12, 2012, the entire contents of which are incorporated by reference for all purposes.

TECHNICAL FIELD

The present disclosure relates to tip-up devices for ice fishing and methods related thereto.

BACKGROUND

Existing tip-ups generally consist of a base designed to straddle a hole drilled in ice for fishing, a vertical descending member secured to the base, a spool of fishing line secured to the vertical descending member so that the spool can turn freely when a fish strikes the fishing line dangling below. A spring-mounted flag is affixed to one end of the base so that the flag can be bent horizontally and placed under a device that causes the flag to snap into a vertical position when the spool turns, indicating a fish strike.

These traditional tip-ups are prone to a number of problems. The moving mechanical parts exposed to cold air can fail due to freezing. Specifically, the lubricating grease contained within the main spool shaft increases in viscosity as the temperature drops, causing difficulty in rotation of the spool and fish loss. Snow can drift over the top of a traditional tip-up so that the flag is prevented from snapping into a vertical position when a fish strikes. A gust of wind can cause the flag on a traditional tip-up to release, falsely suggesting that a fish has struck the line. The triggering of a traditional tip-up flag indicates only that the spool of fishing line has started to turn; there is no indication of whether, and how rapidly, the line continues to be drawn out by a fish.

Traditional tip-up flags are difficult to see in low-visibility conditions such as dawn, dusk, fog, and blowing snow. Traditional tip-up flags are, of course, impossible to see at night without the aid of a lighting tool such as flashlight. There are a number of tip-up-mounted lighting devices in the prior art that are designed to illuminate in conjunction with a triggered flag. But these lighting devices are still reliant on a mechanical triggering device, most commonly the spring-loaded flag itself.

SUMMARY

A tip-up apparatus according to some embodiments includes a base, a descending shaft hingedly coupled to the base, and a spool assembly including a top spool end and being attached to the descending shaft. The apparatus also includes a light tower and an electronic sensor coupled to the descending shaft, the electronic sensor being configured to detect movement of the spool assembly. The light tower houses at least one indicator light and is hingedly coupled to the base. The indicator light is configured to illuminate when the electronic sensor detects movement of the spool assembly.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
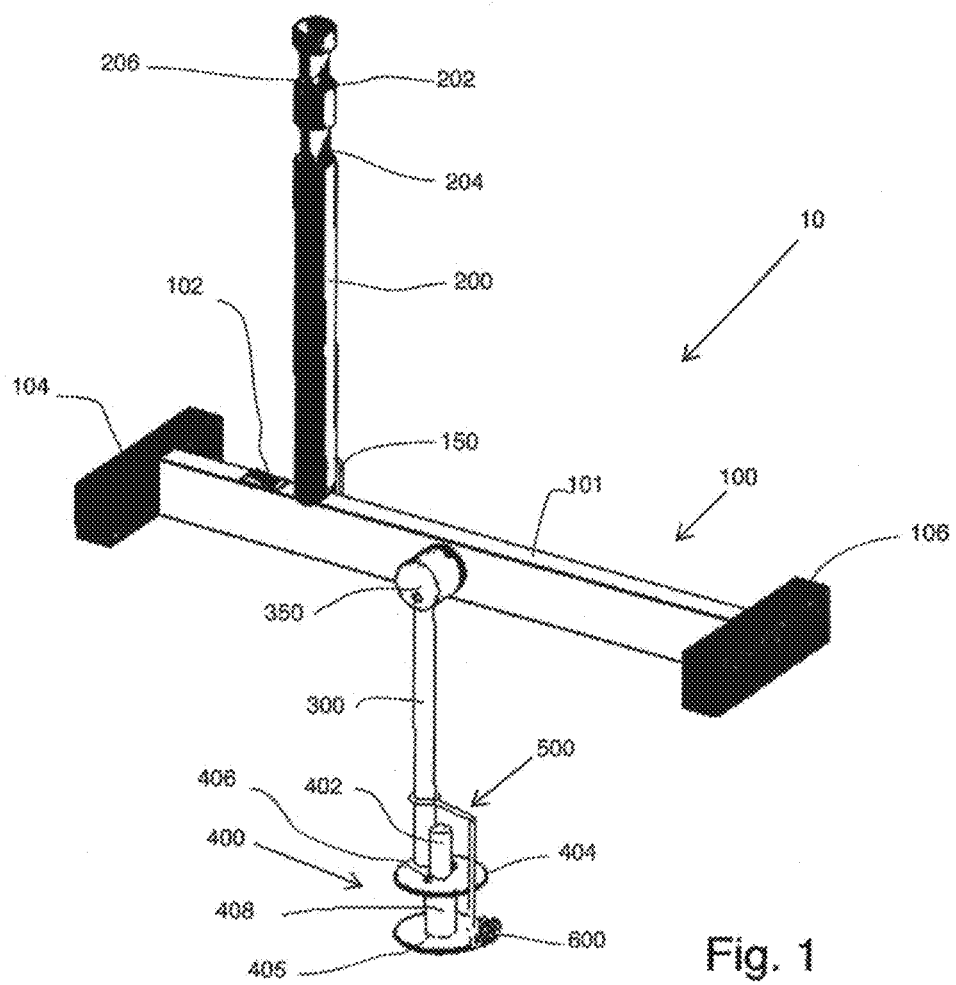
FIG. 1 is an isometric view of the tip-up in a deployed position, according to some embodiments.
Figure 2:
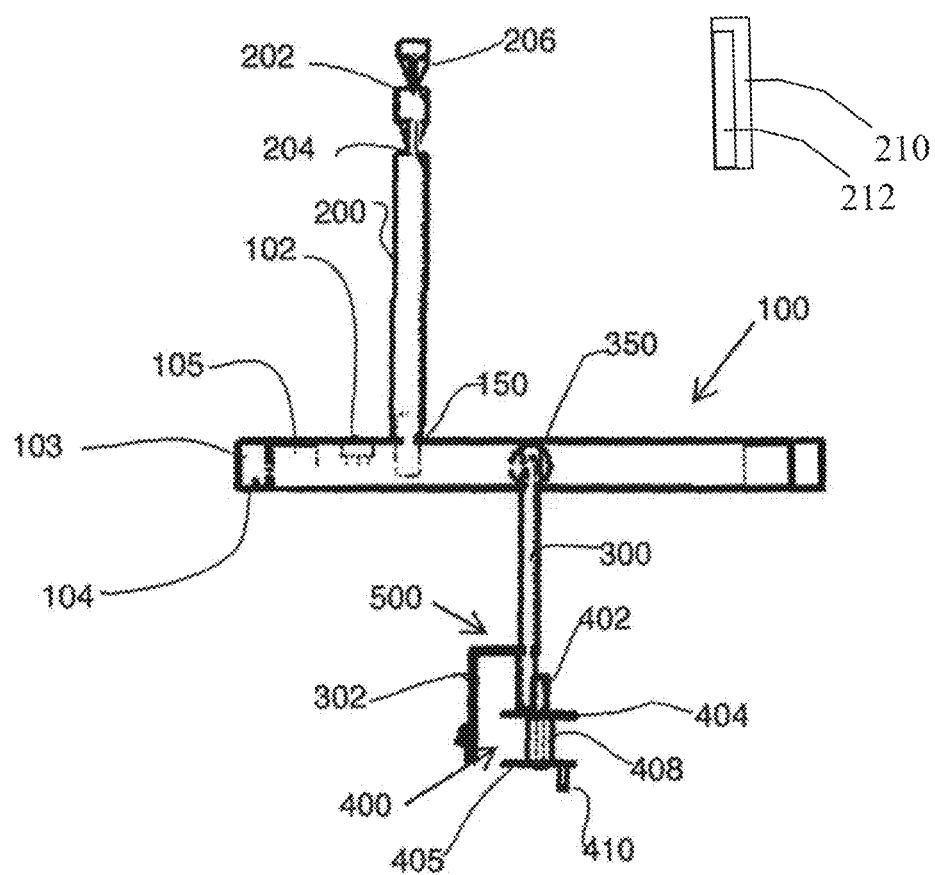
FIG. 2 is a side view of the entire tip-up in a deployed position, according to some embodiments.
Figure 3:
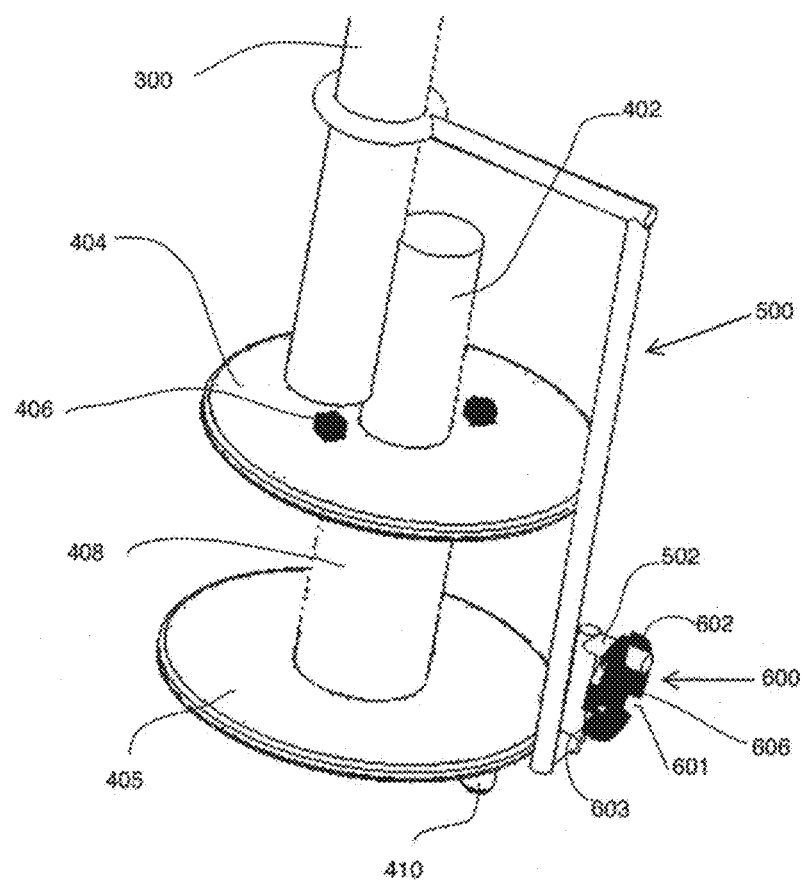
FIG. 3 is an isometric view of the lower part of the tip-up in the deployed position, according to some embodiments.
Figure 4:
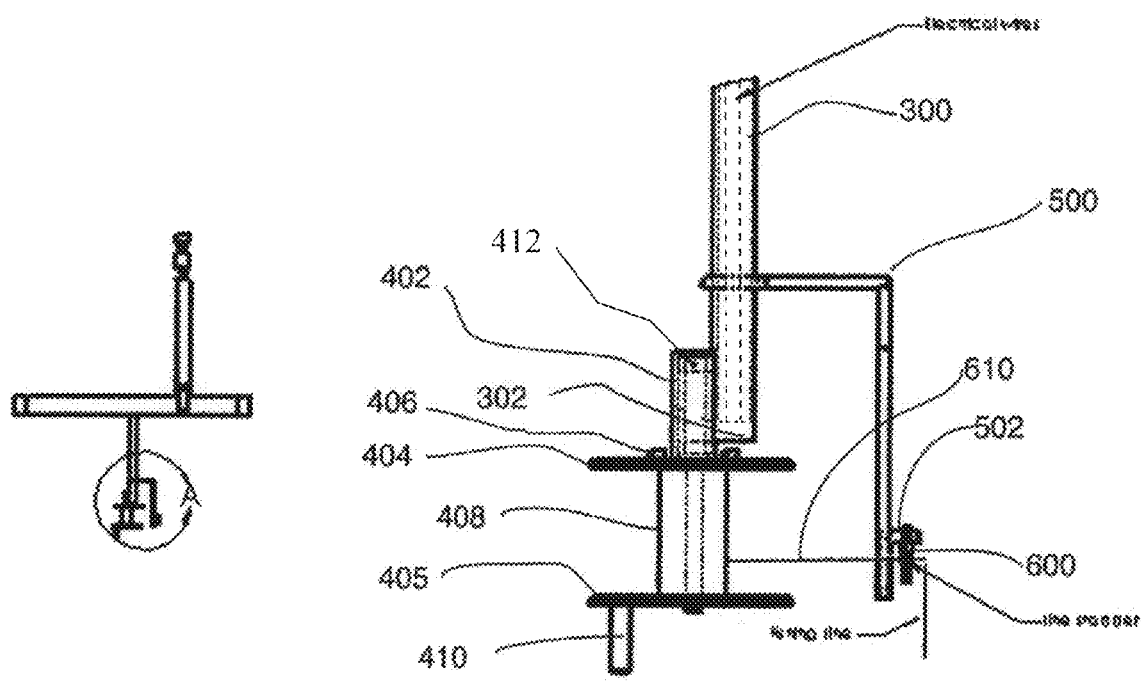
FIG. 4 is a close-up side view of the lower part of the tip-up in the deployed position, according to some embodiments.
Figure 5:
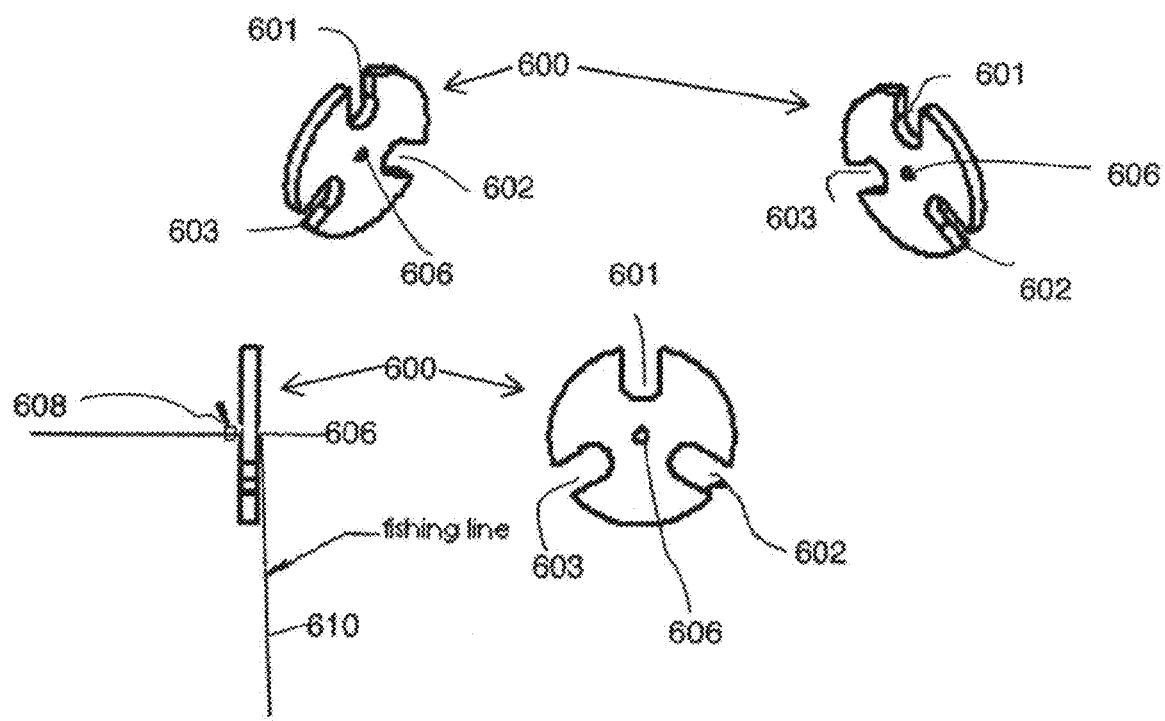
FIG. 5 is a series of views of the line clip, according to some embodiments.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

In the following detailed description, reference is made to the accompanying drawings which form a part hereof, and specific embodiments in which the disclosure may be practiced are shown by way of illustration. It is to be understood that other embodiments may be used and structural changes may be made without departing from the scope of the present disclosure.

According to some embodiments of a tip-up, various problems described above are eliminated. For example, the traditional spring-loaded flag is optionally replaced by two bright strike-indicator lights that are visible both day and night. One light is optionally triggered to illuminate constantly when the spool of fishing line initially turns while a second light flashes in accordance with the rotational rate of the spool of fishing line, providing a visual indication of whether, and how rapidly, the line is being drawn out by a fish. This device is primarily electronic, and the few mechanical parts that must move during a fish strike are underwater during use, which eliminates operational problems generally associated with traditional tip-ups, such as freezing temperatures, blowing wind, drifting snow, and the increased viscosity of the lubricating grease and the related mechanical problems.

Referring now to FIGS. 1-5, the tip-up is generally referred to as 10. As shown, the tip-up 10 is comprised of a base 100, a light tower 200 having at least one indicator light 202, a descending shaft 300, a spool assembly 400, a line guide 500, a line clip 600, and a central circuit board 105 that is in electrical communication with a power source 103, a switch 102, an electronic rotation sensor 302, and at least one indicator light 202.

In some embodiments, the base 100 includes a main base member 101 having a length sufficient to straddle a standard sized hole for ice fishing. Cross pieces 104 and 106 are affixed perpendicularly to each end of the main base member 101. Cross pieces 104 and 106 are of sufficient size and strength to provide torsional stability to the tip-up 10 in a deployed position. In an example aspect, cross piece 104 serves as a battery compartment, and cross piece 106 serves as a storage compartment for miscellaneous items such as fishing supplies or spare batteries.

In some embodiments, the light tower 200 is hingedly connected to the main base member 101 by a hinge 150. When the tip-up 10 is in the deployed position, the light tower 200 extends vertically up from the base 100. The light tower 200 includes at least one indicator light 202 in communication with the upper end of the light tower 200. In an aspect, two indicator lights 202 and 204 are built into the upper end of the light tower, which allows the inclusion of conical reflection mirrors 206 designed to amplify the brightness of the indicator lights 202 and 204. One light is the strike-indicator light 202, which illuminates constantly when the spool assembly 400 initially turns, indicating that a fish has possibly struck the line. The other light is the spool-rotation indicator light 204, which flashes in accordance with the rotational rate of the spool assembly 400, providing a visual indication of whether, and how rapidly, the line is being drawn out by a fish. In some embodiments, an additional indicator light (not shown) or one of the indicator lights 202, 204 is usable as a utility light with a constant "on" capability for local lighting purposes.

While the indicators shown in the accompany figures are generally visual indicators, such as indicators 202, 204, it should be understood that additional types of indicators are contemplated. For example, in some embodiments an audible indicator (e.g., an alarm) is included. In still other embodiments, a signal (e.g., an RF signal) is provided for activating a remote light source, audible alarm, or other device for notifying the angler of tip-up activity.

In some embodiments, the light tower includes a privacy shield, or cover 210. As shown, the cover 210 includes a circular top and a cylindrical sidewall having a window 212. The cover 210 is adapted to be slipped over the upper end of the light tower 200 such that the cover 210 is able to be rotated or otherwise adjusted to a desired position. In some embodiments, the cover 210 is optionally used to block a particular viewing area such that the indicator light(s) are only able to be readily viewed from a desired viewpoint (e.g., from a remote position at which the angler is located). Additionally or alternatively, the cover 210 is optionally used to help block direct sunlight on the indicators, in turn helping allow better visibility of the indicator lights.

In some embodiments, the base 100 includes a switch 102. Placing the switch 102 in the "on" position allows the power source 103 to provide current to the electrical components present in the tip-up 10, including the circuit board 105, the electronic rotation sensor 302, and at least one indicator light 202. In some embodiments, the power source 103 includes one or more batteries, such as four standard AA batteries, which are placed into the cross piece battery compartment 104, although additional or alternative power sources (e.g., solar) are also contemplated. Placing the switch 103 in the "off" position interrupts the flow of current to the electrical components present in the tip-up 10. Placing the switch 102 in the "off" position and then returning the switch 102 to the "on" position resets the electrical components present in the tip-up 10 after one of the indicator lights 202 and/or 204 has been triggered to illuminate due to rotation of the spool assembly 400. In some examples, the switch 102 is built into the main base member 101 at a location between the cross piece functioning as a battery compartment 104 and the position on the main base member 101 where the light tower 200 is hingedly attached. The circuit board 105 is contained within the main base member between the cross piece functioning as a battery compartment 104 and the switch 102.

A descending shaft 300 is hingedly connected near the center of the main base member 101 by a hinge 350. When the tip-up 10 is in the deployed position, the descending shaft 300 extends vertically down from the base 100 and opposite the light tower 200. When the tip-up 10 is in use, the descending shaft 300 is placed into water filling an ice fishing hole. A spool assembly 400 is affixed to the lower end of the descending shaft 300. In some examples, a short spool shaft 402 is affixed adjacently to the lower end of the descending shaft 300. The spool assembly 400 operates as an attachment point for fishing line 610 that is wound around the spool winding hub 408. The spool assembly 400 is freely rotatable upon the fishing line 610 receiving tension. The spool assembly can also be rotated by an angler by means of a spool handle 410 that is affixed near the outer edge of a bottom spool end 405.

In some embodiments, a drive unit (not shown) is included on the side of the spool assembly 400. The drive unit includes a drive gear assembly, such that a power tool (e.g., a battery operated drill) is able to be used to retrieve, or respool, the line or to deploy, or let out line at a desired rate. In some embodiments, the gear assembly includes a first gear coupled to the spool shaft and a second gear coupled to a second shaft that is substantially perpendicular to the spool shaft 402. The second shaft includes an endpiece, such as a hex head receiver, configured to couple with an operating end of a power tool (e.g., a hex bit received in a power drill).

As shown, the spool assembly 400 includes a sealed bearing assembly 412. The sealed bearing assembly 412 is configured to help the spool shaft 402 rotating smoothly. As shown, the spool assembly 400 is configured to be located below the water line in order to help avoid unwanted freezing of the spool assembly (e.g., the spool shaft 402) in use.

Two magnets 406 are affixed to the upper side of a top spool end 404. The magnets 406 are positioned in diametric opposition to each other on the top spool end 404, so that the magnets 406 pass beneath the bottom end of the descending shaft 300 when the spool 400 rotates. An electronic sensor 302 is positioned within the bottom of the descending shaft 300 so that the movement of the magnets 406 passing below can be detected. When motion of the magnets 406 is detected by the electronic sensor 302, an electrical signal is sent to the circuit board 105, which electrically triggers the illumination of at least one indicator light 202.

A line guide 500 is connected to the descending shaft 300 to prevent fishing line 610 from tangling as it is wound and unwound from the spool assembly 400. A line clip holder 502 is a short rod having two ends with roughly the same cross-sectional cylindrical dimensions as the line guide 500. One end of the line clip holder 502 is attached to the distal end of the line guide 500. From the point of attachment to the line guide 500, the line clip holder 502 protrudes horizontally away from the rotational axis of the spool assembly 400.

The line clip 600 is a planar piece that includes a hole 606 that is large enough so that fishing line 610 can be threaded through the hole 606 and small enough so that a bobber stop 608 cannot pass through the hole 606. The line clip 600 also includes at least one notch 601 having sufficient size to fit snuggly onto the exposed end of the line clip holder 502. In some examples, the hole for fishing line 606 is in the center of a circular line clip 600, and three notches of slightly different widths (601, 602, and 603) have been cut at equal 120-degree intervals around the circumference of circular line clip 600.

When a fish strikes the fishing line 610, the line tension created by the swimming fish pulls the line clip 600 free from the line clip holder 502. The differing widths of the u-shaped notches (601, 602, and 603) allow an angler to adjust the degree of force required to remove the line clip 600 from the line clip holder 502. An angler using a large live minnow for bait might want to use one of the tightest notch 601 on the line clip 600 so that the force of the minnow's swimming would not create false strikes. By contrast, an angler fishing for a smaller species of fish with an inactive type of bait or lure might want to use a loosest notch 603 so that a less powerful fish could pull the line clip 600 off of the line clip holder 502. An angler can also adjust the position of the bobber stop 608 on the fishing line 610 to set the length of fishing line 610 that extends beyond the line clip 600 and dangles below the tip-up 10.

Figure 6:
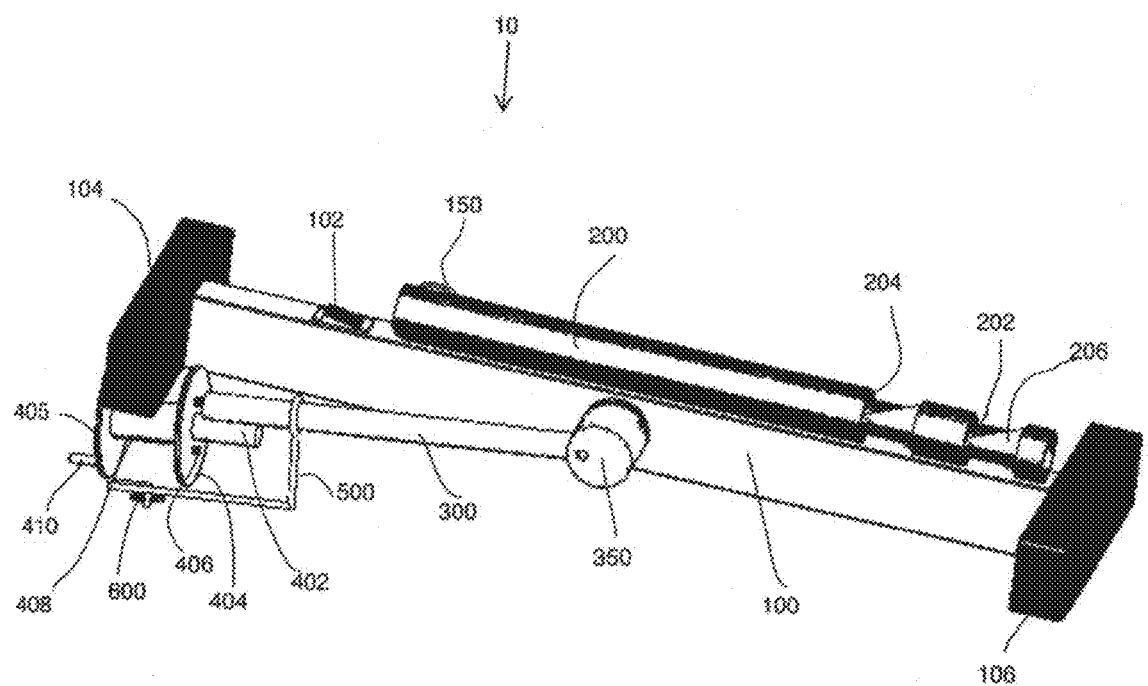
FIG. 6 is an isometric view of the tip-up in a folded position, according to some embodiments.
Figure 7:
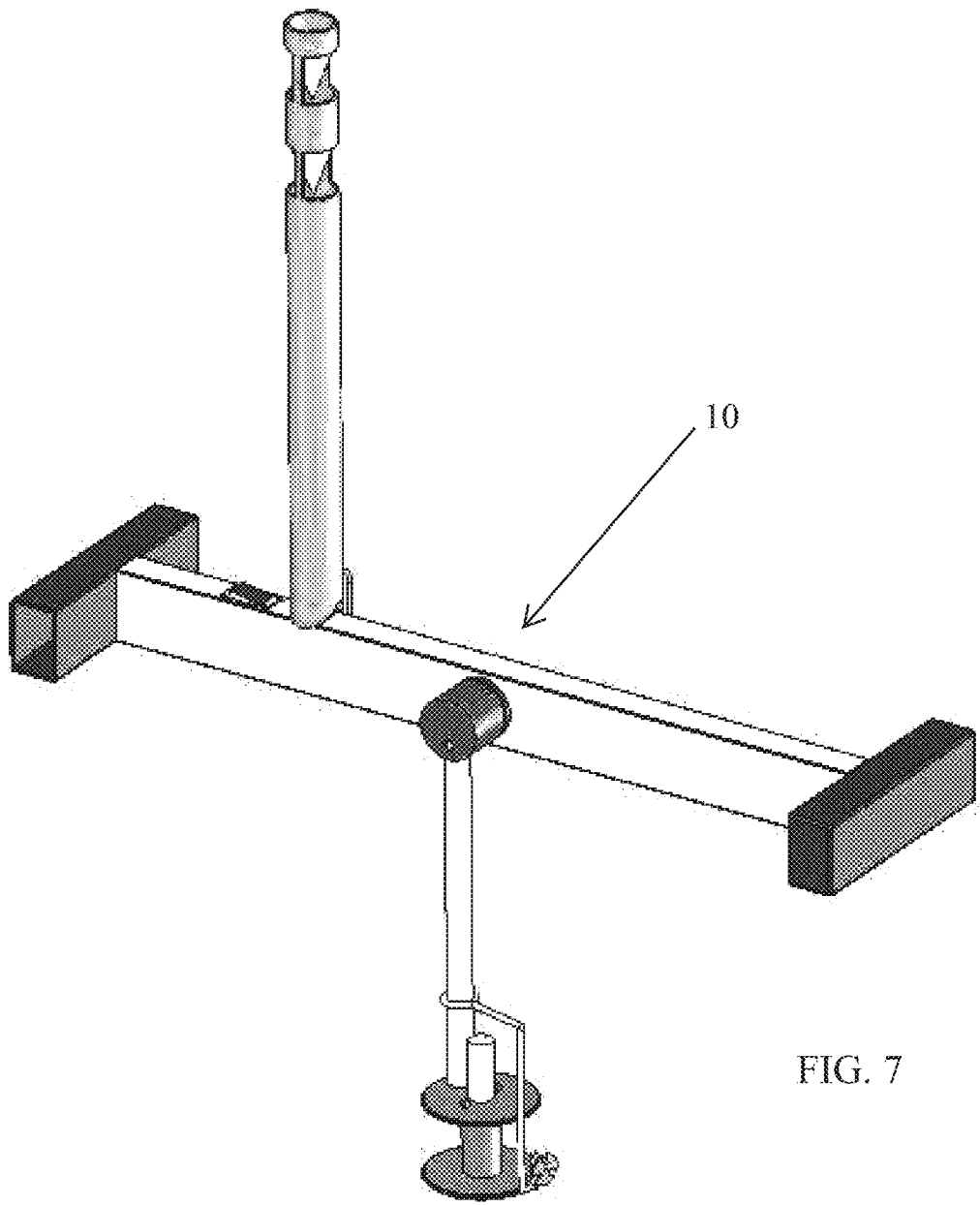
FIGS. 7-11 are additional views of various features of the tip-up with some feature numbering removed for ease of illustration, according to some embodiments.
Figure 8:
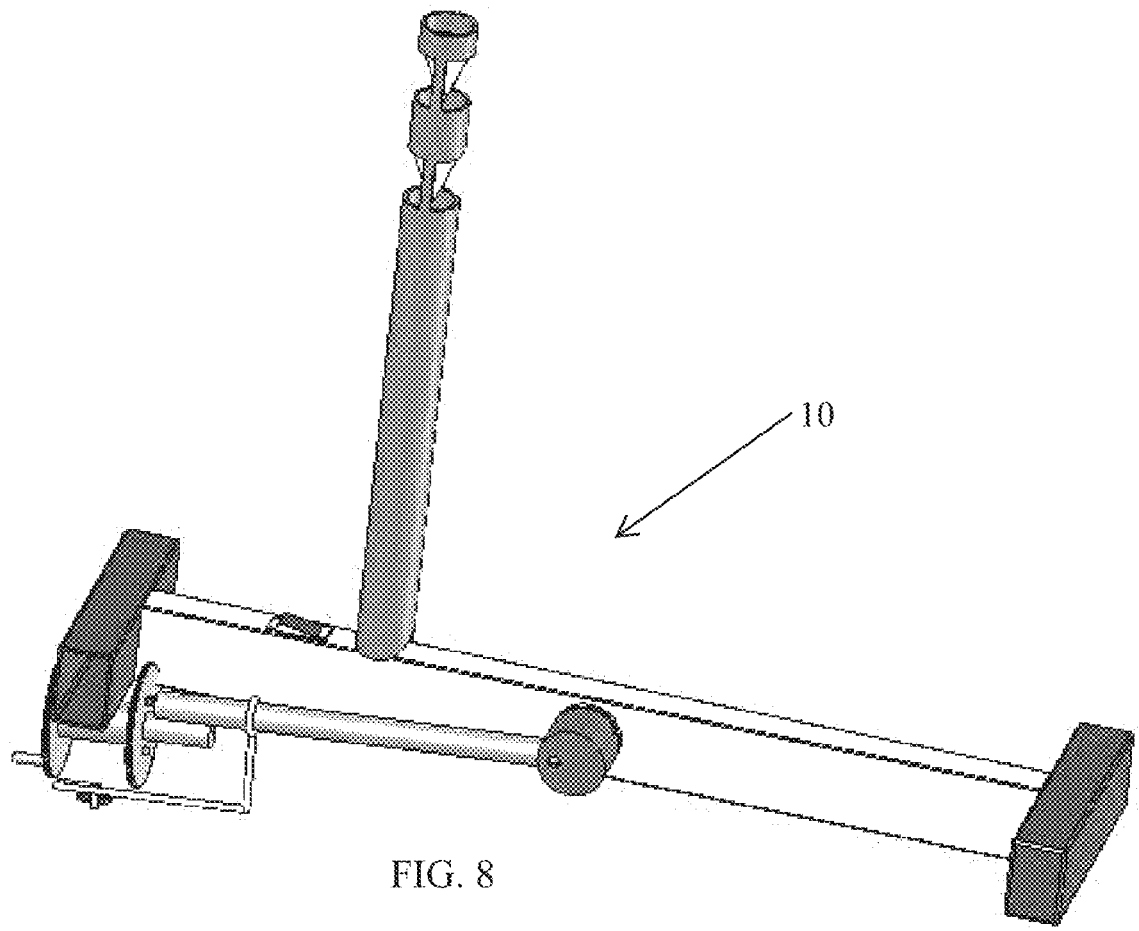
Figure 9:
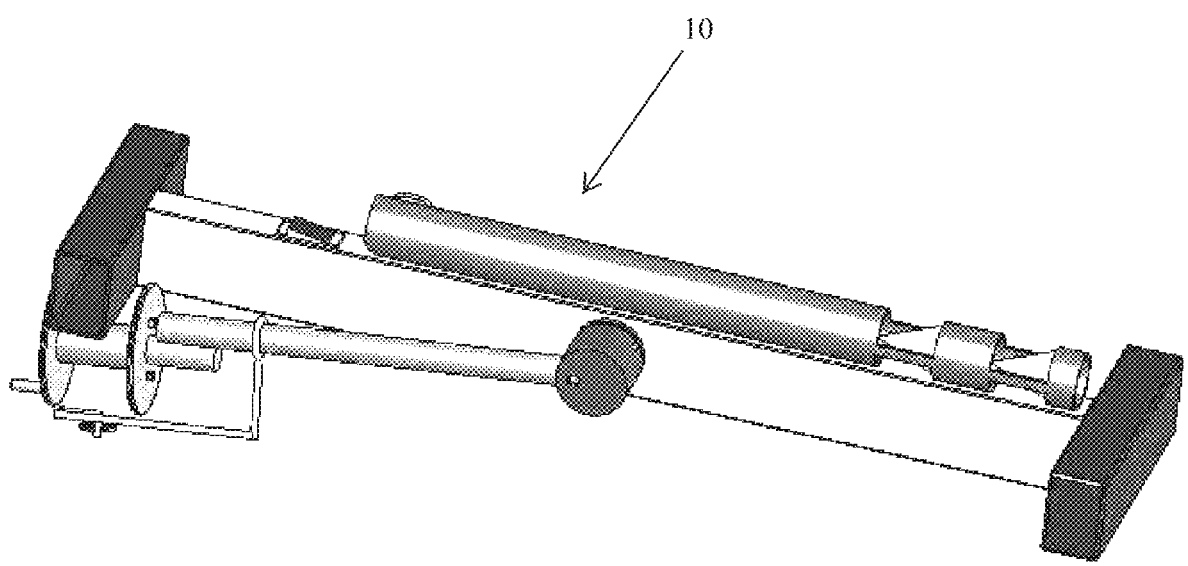
Figure 10:
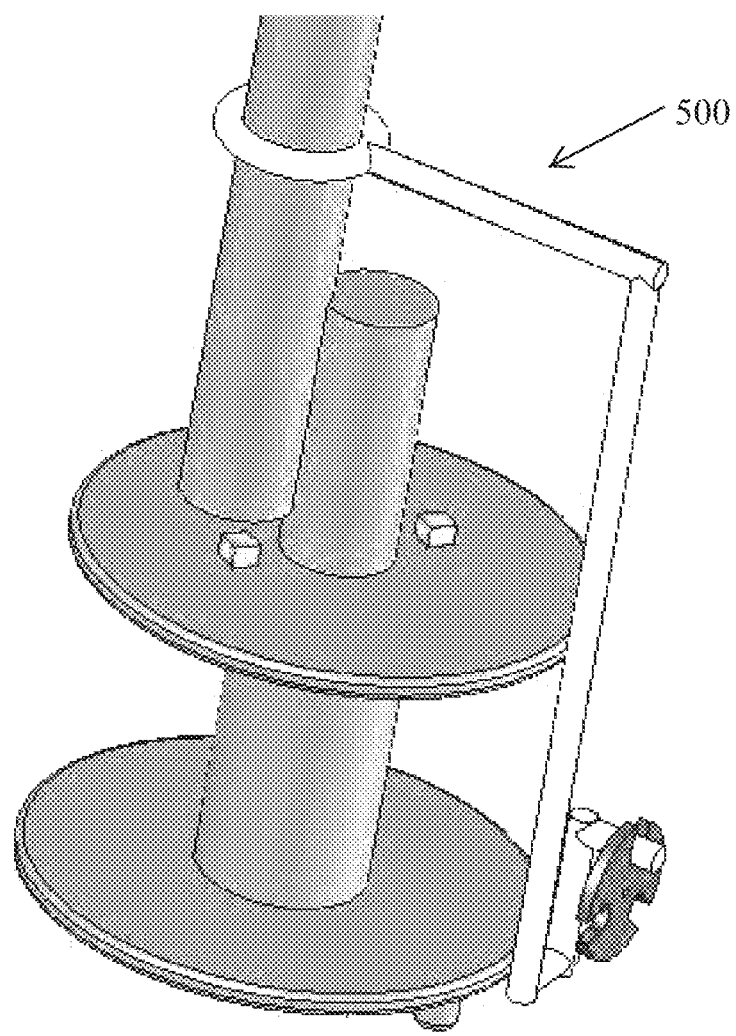
Figure 11:
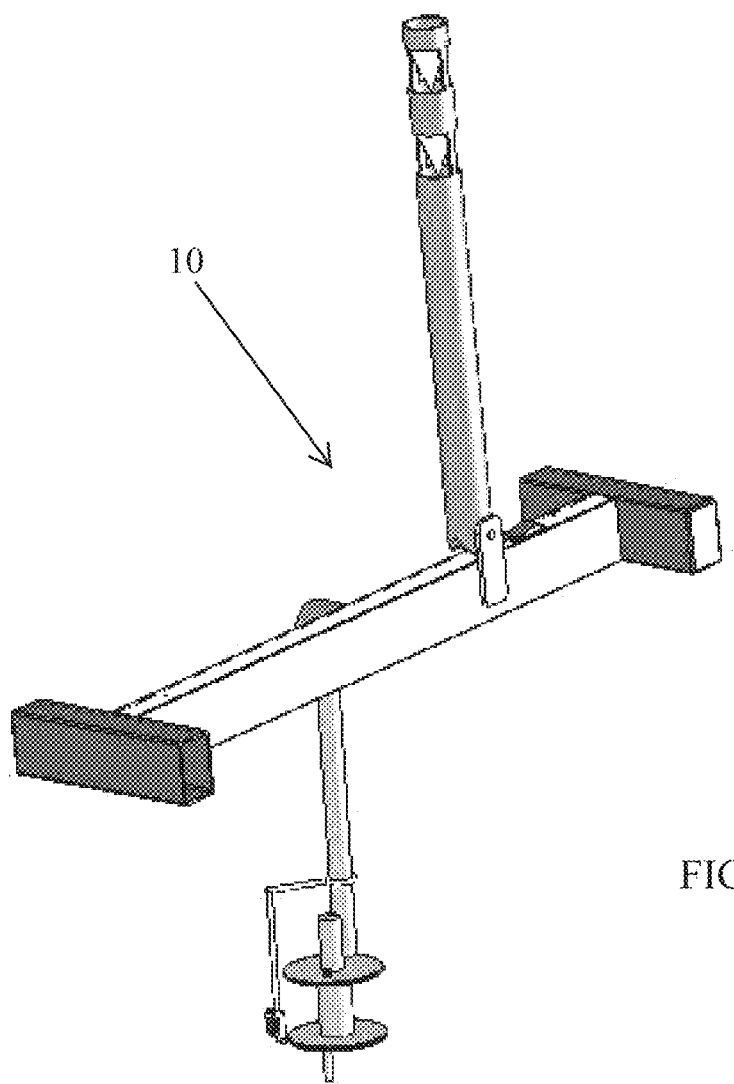
Figure 12:
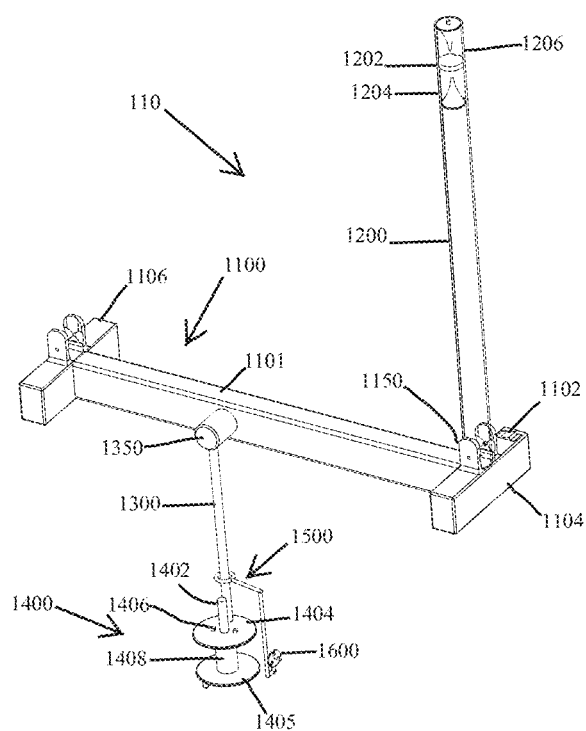
FIGS. 12-16 are views of another tip-up, according to some embodiments.
Figure 13:
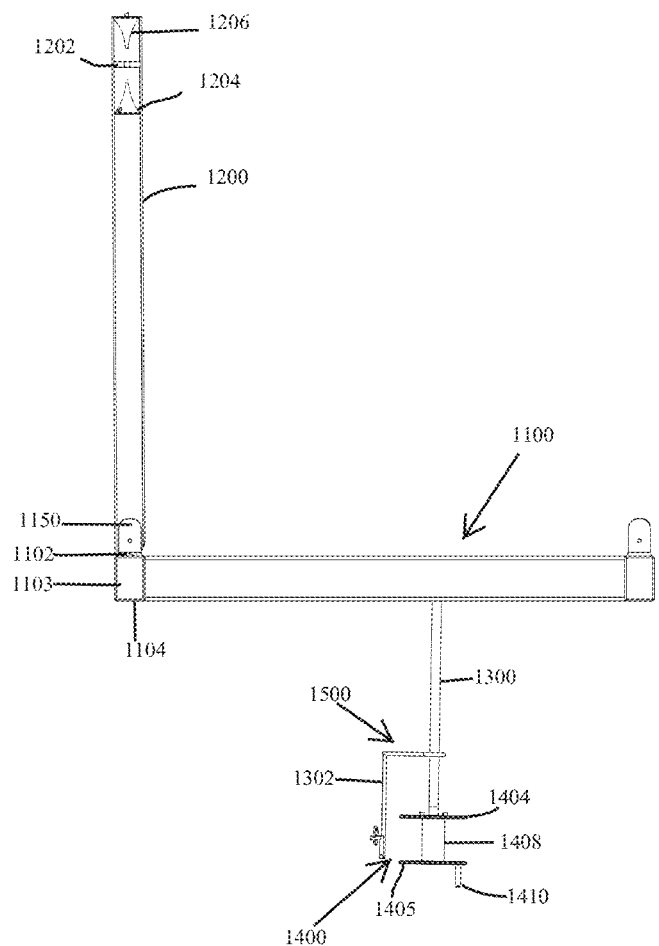
Figure 14:
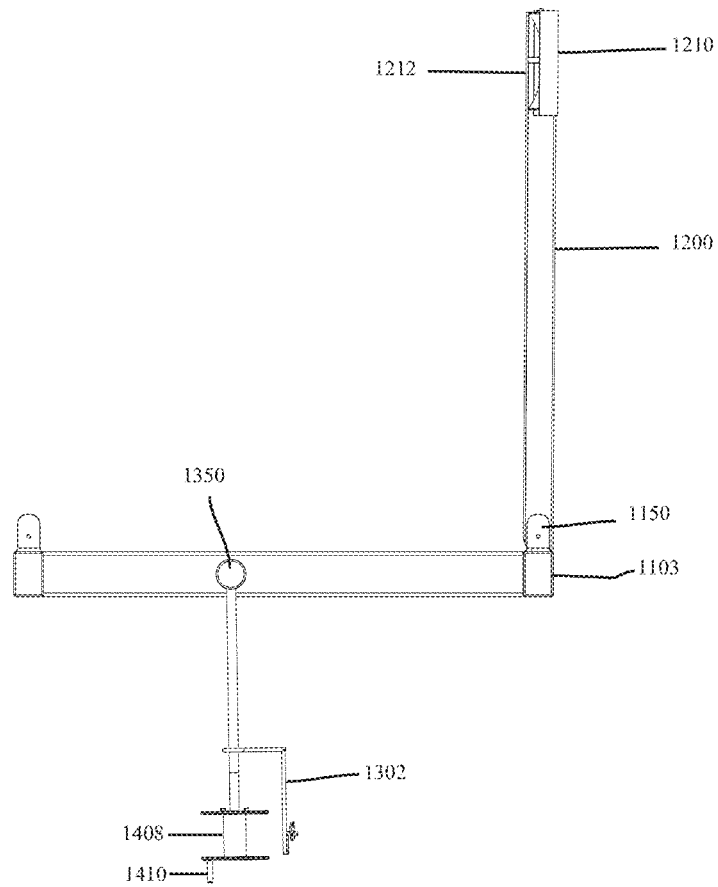
Figure 15:
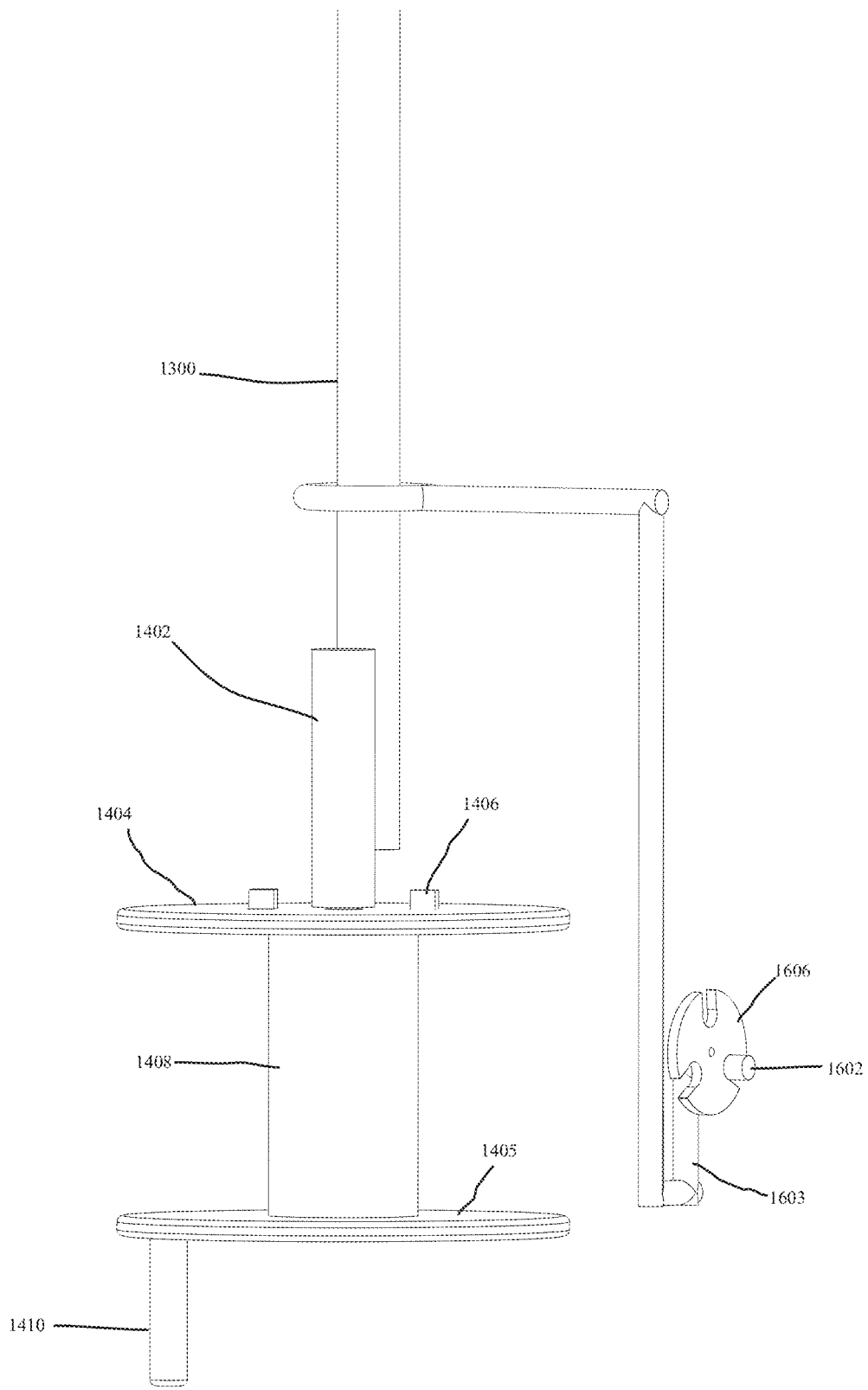
Figure 16:
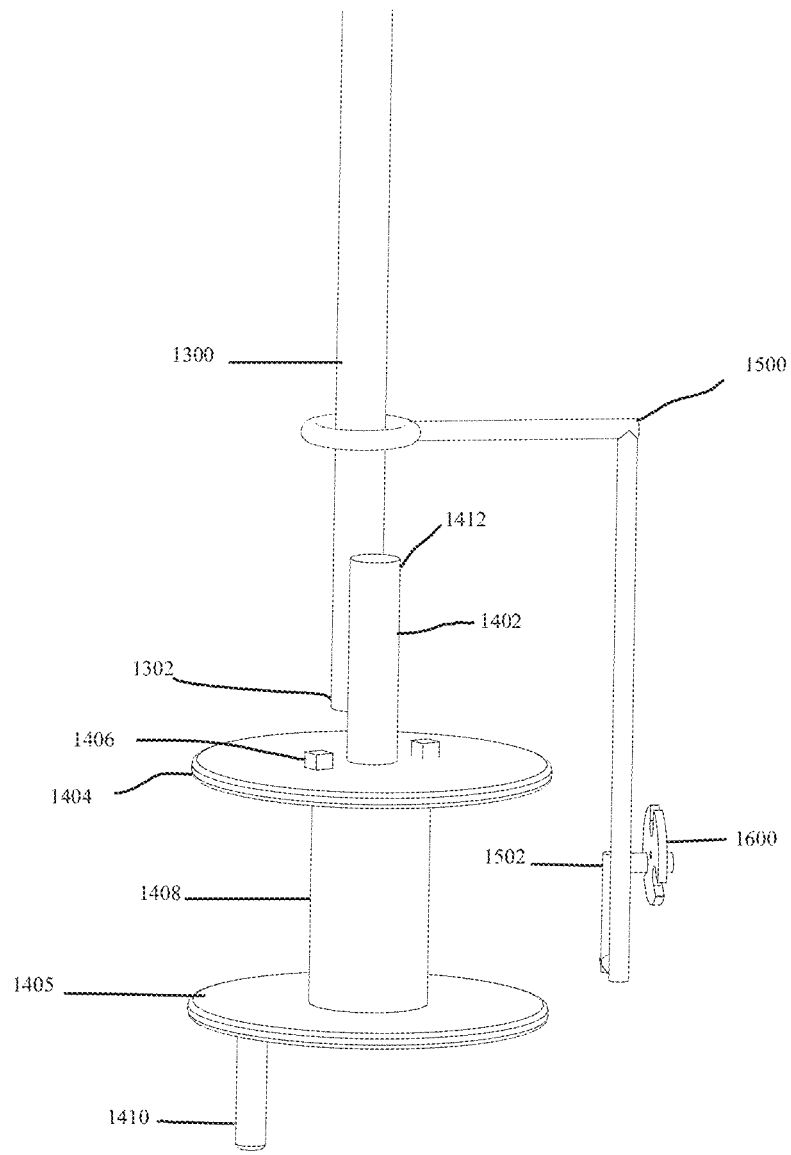

Referring now to FIG. 6, the tip-up 10 is shown in the folded position. The light tower 200 is folded against the upper side of the base 100. The descending shaft 300 is folded against the lower side of the base 100. In some examples, the light tower 200 is hingedly connected near one end of the base 100, so that when it is folded toward the other end of the base 100 the light tower 200 does not extend beyond the end of the base 100. The descending shaft 300 is hingedly connected near the center of the base 100. When the descending shaft 300 is folded against the bottom side of the base 100, the two ends of the spool assembly (404 and 405) straddle one side of the base cross-piece 104.

In an aspect of the present disclosure, the tip-up 10 is constructed out of metal, such as aluminum, for its strength, weight, and durability. Preferably, the indicator lights 202 and 204 are light emitting diodes (LED) due to their properties of high brightness and low consumption of power.

FIGS. 12-16 are views of another tip-up 110, according to some embodiments. As shown, various features of the tip-up 110 are substantially similar to features of the tip-up 10, where similar features of the tip-up 110 to those of the tip-up 10 are denoted by the same numeral as the tip-up 10 with an additional "1" in front of the numeral (e.g., as with tip-up "10" and tip-up "110").

Various modifications and additions can be made to the exemplary embodiments discussed without departing from the scope of the present disclosure. For example, while the embodiments described herein refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

I claim:

1. A tip-up apparatus, comprising:
a base,
a descending shaft hingedly coupled to the base and defining a longitudinal axis;
a spool assembly that is configured to house a spool of fishing line and is rotatable when a tension force is exerted on the fishing line, the spool assembly being attached to the descending shaft and defining a longitudinal axis of rotation about which the spool assembly can rotate, the spool assembly including a top spool end, and wherein the longitudinal axis of rotation of the spool assembly and the longitudinal axis of the descending shaft are non-orthogonal to each other and are offset from each other;
an electronic sensor coupled to the descending shaft, wherein the electronic sensor is configured to detect movement of the spool assembly; and
a light tower housing at least one indicator light, the light tower hingedly coupled to the base, wherein the at least one indicator light is configured to illuminate when the electronic sensor detects movement of the spool assembly.

2. The tip-up apparatus of claim 1, further comprising at least one magnet coupled to the top spool end, the electronic sensor being configured to detect movement of the magnet associated with rotation of the spool assembly.

3. The tip-up apparatus of claim 2, wherein the at least one magnet is a first magnet, and the tip-up apparatus further comprises a second magnet on the top spool end in diametric opposition to the first magnet.

4. The tip-up apparatus of claim 1, wherein the light tower housing further comprises at least one conical reflection mirror configured to reflect light emanating from the at least one indicator light.

5. The tip-up apparatus of claim 1, further comprising a circuit board in electronic communication with the electronic sensor and a power source in electrical communication with the circuit board.

6. The tip-up apparatus of claim 1, wherein the at least one indicator light comprises a strike-indicator light configured to illuminate when the electronic sensor detects rotational movement of the spool assembly.

7. The tip-up apparatus of claim 1, wherein the at least one indicator light comprises a spool-rotation indicator light configured to flash in accordance with a rotational rate of the spool assembly.

8. The tip-up apparatus of claim 1, further comprising a switch configured to control electrical power to the tip-up apparatus.

9. The tip-up apparatus of claim 1, wherein the electronic sensor is positioned within the descending shaft.

10. The tip-up apparatus of claim 1, wherein when the tip-up apparatus in a deployed position, the descending shaft extends vertically downward from the base and the light tower extends vertically upward from the base.

11. The tip-up apparatus of claim 1, further comprising a line guide coupled to the descending shaft, wherein the line guide is configured to prevent fishing line associated with the tip-up apparatus from tangling during operation.

12. The tip-up apparatus of claim 11, further comprising:
a line clip holder coupled to the line guide; and
a line clip receivable by the line clip holder, the line clip configured to hold the fishing line.

13. The tip-up apparatus of claim 12, wherein the line clip comprises a plurality of notches, each notch of the plurality of notches having an associated pressure required to remove the line clip from the line clip holder.

14. The tip-up apparatus of claim 13, wherein each notch of the plurality of notches has a unique associated width.

15. The tip-up apparatus of claim 13, wherein each notch of the plurality of notches has a U-shape.

16. The tip up apparatus of claim 1, wherein the descending shaft defines a lower end, the spool assembly being attached proximate the lower end of the descending shaft.

17. The tip-up apparatus of claim 1, wherein the at least one indicator light comprises a light-emitting diode (LED).

18. A tip-up apparatus, comprising:
a base,
a descending shaft hingedly coupled to the base;
a spool assembly attached to the descending shaft, wherein the spool assembly includes a top spool end;

an electronic sensor coupled to the descending shaft, wherein the electronic sensor is configured to detect movement of the spool assembly;

a light tower housing at least one indicator light, the light tower hingedly coupled to the base, wherein the at least one indicator light is configured to illuminate when the electronic sensor detects movement of the spool assembly;

a line guide coupled to the descending shaft, wherein the line guide is configured to prevent fishing line associated with the tip-up apparatus from tangling during operation;

a line clip holder coupled to the line guide; and a line clip receivable by the line clip holder, the line clip configured to hold the fishing line, the line clip comprising a plurality of notches, each notch of the plurality of notches having an associated pressure required to remove the line clip from the line clip holder.

19. The tip-up apparatus of claim 18, wherein each notch of the plurality of notches has a unique associated width.

20. The tip-up apparatus of claim 18, wherein each notch of the plurality of notches has a U-shape.

* * * * *